United States Patent [19] [11] Patent Number: 4,604,369
Shi [45] Date of Patent: Aug. 5, 1986

[54] METHOD OF BENEFICIATING KAOLIN CLAY UTILIZING AMMONIUM SALTS

[75] Inventor: Joseph C. S. Shi, Bartow, Ga.

[73] Assignee: Thiele Kaolin Company, Sandersville, Ga.

[21] Appl. No.: 644,614

[22] Filed: Aug. 27, 1984

[51] Int. Cl.[4] .............................................. C04B 33/04
[52] U.S. Cl. ..................................... 501/148; 501/146; 423/118; 209/5
[58] Field of Search .................... 501/148, 146; 209/5; 423/111, 118

[56] References Cited

U.S. PATENT DOCUMENTS

| 2,710,244 | 6/1955 | Bertorelli | 423/111 |
| 3,371,988 | 3/1968 | Maynard et al. | 501/146 |
| 3,701,417 | 10/1972 | Mercade | 209/5 |
| 3,857,781 | 12/1974 | Maynard | 209/5 |
| 4,186,027 | 1/1980 | Bell et al. | 209/5 |

FOREIGN PATENT DOCUMENTS 2412787 10/1974 Fed. Rep. of Germany .......... 209/5

Primary Examiner—William R. Dixon, Jr.
Assistant Examiner—Steven Capella
Attorney, Agent, or Firm—Marshall, O'Toole, Gerstein, Murray & Bicknell

[57] ABSTRACT

A method of enhancing the brightness (beneficiating) of kaolin clays by removing titanium impurities is disclosed. The claimed method is a selective flocculation process wherein clay solids are blunged (dispersed) in water together with a dispersing agent and an ammonium salt conditioning agent. When a water-dispersible anionic polymer is added to the dispersed and conditioned clay suspension, titanium flocs are separated from the suspension yielding a whiter kaolin clay product. Unlike prior art selective flocculation processes, the use of highly-dilute dispersions and/or multiple washing steps is not required.

18 Claims, 2 Drawing Figures

METHOD OF BENEFICIATING KAOLIN CLAY UTILIZING AMMONIUM SALTS

BACKGROUND OF THE INVENTION

Kaolin clays are hydrous aluminum silicates which, when purified, are white in color. These clays exhibit good covering or hiding power when used as a pigment or extender in coating and filling operations. Naturally occurring kaolin clay, however, contains discoloring contaminants such as iron and titanium. For certain industrial processes, such as coatings for premium grade papers, the level of these contaminants must be reduced in order to obtain a satisfactory coating product—a high-brightness clay.

In general industrial practice, iron contaminants can be removed by leaching methods using iron-reducing chemicals such as zinc or sodium hydrosulfite. However, no economical leaching chemical is known for discoloring titanium impurities.

There are three commercially employed practices for removing discoloring titanium impurities: high intensity magnetic separation, flotation, and selective flocculation. Unfortunately, high intensity magnetic separation is not effective for submicron particles and, therefore, it is difficult to remove enough discolored titanium impurities to produce high brightness clay. Though flotation and selective flocculation methods can be effective in producing high brightness clay, the currently available processes are either complicated and critical in processing, or result in undesirable residual chemicals after processing.

The objective of the present invention is to provide a novel, simple, and effective process for removing the discolored titanium impurities by selectively flocculating the impurities from kaolin clay. A further objective of the invention is to improve the brightness of kaolin clay with the minimum amount of processing chemicals and to produce a product which contains a minimum amount of undesirable residual chemicals. Yet another objective is to obtain high-brightness kaolin clay, a product having a G.E. brightness level of 89 or above. (In accordance with the G.E. brightness standard, pure MgO is assigned a G.E. value of 100. A number of 83.5 represents 83.5% of the MgO standard brightness.)

Two approaches are available for clay beneficiation by selective flocculation
1. The clay is flocculated and the impurities are left in suspension
2. The impurities are flocculated and the clay is left in suspension.

Generally, the first approach is not practical due both to the high consumption of reagents in flocculating the major constituent of the crude clay (clay particles) and to the resultant contamination of the clay product by the presence of the flocculating reagent. Examples of this first approach are presented in U.S. Pat. Nos. 3,477,809, 3,808,021, and 3,837,482.

The second method selectively flocculating the impurities, is a more practical approach to the clay beneficiation process. Because impurities are minor constituents in the composition, less reagent is used in the floccing step. This results in less entrapment of non-flocced matter, and thus product recovery is improved. Because a relatively low level of reagent is used, there is less reagent contamination of the clay product. Examples of this second approach are illustrated in U.S. Pat. Nos. 3,701,417 and 3,857,781.

In the procedure of U.S. Pat. No. 3,701,417, the impure clay is first deflocculated and the impurities liberated. The deflocculated slip is then pH adjusted and treated with polyvalent cations (e.g., calcium, magnesium, barium, zinc, etc.) Finally, an anionic polymer is added to the treated slip to flocculate the impurities.

It is well recognized in the clay processing field that the presence of polyvalent cations drastically increases the viscosity of the clay slip. As a result, the flocculation step of U.S. Pat. No. 3,701,417 must be operated at a low solids level—around 5 percent. Moreover, the residual polyvalent cations in clays produced by this process increase the product viscosity. A procedure which can be run at higher solids levels and which avoids residual polyvalent cations would be commercially advantageous.

U.S. Pat. No. 3,857,781 shows a multi-step flocculation procedure for removing titanium impurities from clay. The preferred salt utilized as a conditioning agent in this process is sodium chloride, although the patent states that other salts, including ammonium chloride, can be employed. The U.S. Pat. No. 3,857,781 teaches that satisfactory purification of a clay dispersion can be achieved if the clay is flocced twice. As a result, a large amount of dispersant must be utilized in the process to reflocculate the clay. This reflocculated clay is further treated with a high dosage of sodium chloride and requires substantial aging before the addition of the polymer flocculant.

The process of U.S. Pat. No. 3,857,781 is effective in impurity removal and can be operated at an economical flocculation solids of around 20 percent. However, the level of dispersants and conditioning agents in the treated clay make multi-washes of the product unavoidable and the presence of excess dispersant requires a high dosage of acid and aluminum sulfate for product coagulation before filtration or washing. (Generally, nine pounds of sulfuric acid and fourteen pounds of aluminum sulfate per ton of clay are required as described in examples of the patent).

SUMMARY OF THE PRESENT INVENTION

The process of the present invention follows the second approach toward selective flocculation, i.e., selectively flocculating the impurities and leaving the clay in suspension. The process uses monovalent cations (unlike U.S. Pat. No. 3,701,417) without excess dispersant (unlike U.S. Pat. No. 3,857,781). The method is essentially a three-step process which can be performed on a continuous basis, i.e., there is no requirement for "aging" the treated clay.

1. Clay Blunging with Dispersants and Conditioning Reagents

The first step of the process is to blunge the clay in water with a sufficient amount of dispersants and conditioning reagents. The dispersant functions to disperse the clay and break the clay particles in aqueous suspension. Typical dispersants employed include mixtures of sodium hexametaphosphate with either sodium metasilicate or soda ash. However, any conventional dispersant can be used in the process.

The amount of dispersant which is employed is that sufficient to achieve minimum Brookfield viscosity at the blunging solids. The use of excess dispersant should be avoided in view of its adverse effects in processing the clay product. Thus, the aqueous suspension should be substantially free of excess dispersing agents. The amount of dispersant to be employed can be determined by treating a clay sample with a dispersant material and observing the level of dispersant at which minimum viscosity occurs.

The conditioning reagent serves to develop dissimilar surfaces between the dispersed clay particles and the impurities. Although a number of soluble salts can be used as conditioning agents, it has been found that monovalent cations (e.g., $Na^+$, $K^+$) exhibit good selectivity only at relatively high dosages. Polyvalent cations, while requiring smaller dosages, exhibit poor selectivity and hence result in low recovery. The preferred conditioning reagents for use in the method of the present invention are ammonium salts which have been found to exhibit excellent selectivity in small dosages.

The conditioning reagent can be added to the crude clay after the clay has been well-dispersed in water. However, conditioning reagents added in this fashion require, in general, higher reagent dosages to achieve good clay recovery and satisfactory removal of impurities. It is preferred to blunge the clay with water, dispersants, and conditioning reagents simultaneously. This mixed blunging has been found, unexpectedly, to improve product quality, use less conditioning reagents, eliminate aging time, and simplify processing steps and equipment.

According to the prior art, complete dispersion of clay particles is a prerequisite to a selective flocculation process. That is, prior art patents (e.g. U.S. Pat. Nos. 3,701,417 and 3,857,781) teach that their treatments are only effective after the clay is completely dispersed and the pH is adjusted to an alkaline value. The process of the present invention is not pH dependent and is effective in broad pH ranges from pH 5 to 11. Furthermore, complete dispersion of the particles before reagent treatment is not essential to achieve good results when practicing the method herein.

It is preferred to blunge the crude clay in water at high solids (45 percent to 70 percent) for better liberation. Since high solids blunging can raise the temperature of the slip to over 100° F., dispersants which are stable at high temperature are preferred. However, for dispersants which are not stable at high temperature, the blunging system can be cooled. Though the process can be practiced in broad pH ranges from pH 5 to 11, a neutral pH results in the minimum required dispersant dosage.

The required dosage of conditioning reagent depends on the amount of clay impurities and the types of polymer flocculant to be used. In general, from 0.1 pound to 10 pounds of aluminum salt per ton of clay can be employed. Higher dosages of conditioning reagent can serve to remove more impurities but lessens recovery of the clay product. The preferred dosage of ammonium salt is from 0.5 pound to 5 pounds per ton of clay. In addition to its advantages of excellent selectivity and small dosage requirements, the use of ammonium salts as a conditioning reagent also has the advantage of leaving little residue on the final clay product due to its evaporation properties.

2. Polymer Flocculation

The dispersed and reagent-conditioned slip is diluted to 10 to 40% solids, preferably 20% solids, and a diluted anionic polymer flocculant is added for selective flocculation. Although the type of flocculant is not critical, a weak anionic polymer (e.g., a polyacrylamide polymer containing both anionic groups and nonionic groups), such as Nalco 8872, Percol 730, or Percol 90L, is preferred. These high molecular weight materials serve to separate the suspended clays from the impurities.

The amount of polymer flocculant to be used depends on the level of the clay impurities. Generally, the range of flocculant is from 0.01 pounds to 5 pounds per ton of clay, preferably 0.1 pound to 1 pound per ton of clay. White streaks can be observed immediately after the polymer flocculant is mixed into the clay slip.

3. Floc Separation

After the flocculant mixing step, the slip is ready for separation. The heavy flocs of impurities can be separated by using either gravitational or centrifugal force. The selectively flocced impurities settle at a rate greater than one inch per minute using gravitational force. Thus, the settling time will depend upon the height of material in the slip-containing vessel. The remaining white kaolin suspension can be subjected to conventional processes, such as filtration, redispersion, and spray drying to achieve a final product.

After the blunging and polymer flocculation steps, the separated white clay suspension usually has a G.E. brightness of over 87. This clay can be further treated with conventional hydrosulfite leaching (to remove iron impurities) to obtain a high G.E. brightness of over 90.

DETAILED DESCRIPTION OF THE INVENTION

Figure 2:
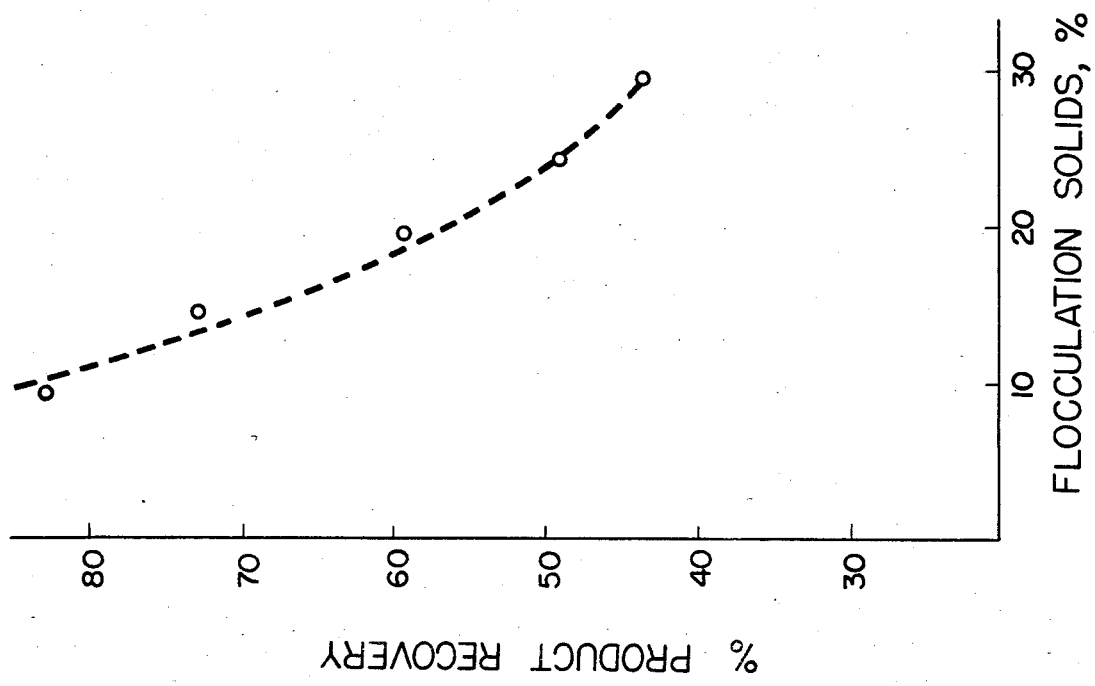
FIGS. 1 and 2 are graphic illustrations of the effect of the solids level of the clay slip on titanium impurity level and clay product recovery. The procedure utilized in generating the data shown in FIGS. 1 and 2 is set out in Example XI.

The following examples are provided to illustrate the method of the present invention. All parts and percentages in the examples, as well as throughout this specification, are by weight unless otherwise specified.

Examples I and II illustrate the effectiveness of the selective flocculation method of the present invention in treating East Georgia Kaolin clays when compared with a control. The results of the treatment are summarized in Table 1.

EXAMPLE I

Classified Control

Four separate samples of crude clay (each approximately 3,000 grams) from two East Georgia mines were blunged at 35% clay solids in water using a Cowles dissolver. A mixture of 3.0 grams of sodium hexametaphosphate (SHMP) and 3.0 grams of soda ash (S.A.) were used to disperse each of the crude clay samples (2 lbs. SHMP and 2 lbs. S.A. per ton of clay).

This dispersed crude was then classified by settling for 20 minutes per inch of slurry depth. The product remaining in suspension was decanted, coagulated with 7.5 grams of aluminum sulfate (5 lbs. per ton of clay) and 6 grams of sulfuric acid (4 lbs. per ton of clay). The coagulated clay was leached using 13.5 grams of sodium hydrosulfite (9 lbs. per ton of clay), filtered, redispersed, and spray dried. Results are shown in the "Classified Control" column of Table I.

EXAMPLE II

Effect of the Process Using Two Dispersant Systems

TABLE I

| Sample Number | Crude Source | | Crude | Classified Control (Settled 20 min./in. | SELECTIVE FLOCCULATION Using SHMP & SMS Dispersants | Using SHMP & S.A. Dispersants |
|---|---|---|---|---|---|---|
| | | | | | (4 lb/T SHMP 4 lb/T SMS) | (4 lb/T SHMP 4 lb/T S.A.) |
| 1 | Mine #1 | Recovery (% for crude) G.E. Brightness $TiO_2$ (%) $Fe_2O_3$ (%) | 78.4 2.93 0.82 | 88 85.3 2.89 0.84 | 67 91.4 0.42 0.81 | 51 91.5 0.27 0.80 |
| | | | | | (3.5 lb/T SHMP 4 lb/T SMS) | (4.5 lb/T SHMP 2 lb/T S.A.) |
| 2 | Mine #2 | Recovery (% for crude) G.E. Brightness $TiO_2$ (%) $Fe_2O_3$ | 76.2 4.08 0.94 | 83 82.9 3.96 0.97 | 52 91.1 0.39 0.90 | 43 89.6 0.52 0.92 |
| | | | | | (4 lb/T SHMP 4 lb/T SMS) | (5 lb/T SHMP 2 lb/T S.A.) |
| 3 | Mine #1 | Recovery (% for crude) G.E. Brightness $TiO_2$ (%) $Fe_2$ (%) | 78.9 3.64 0.83 | 83 83.7 3.54 0.78 | 73 91.2 0.59 0.81 | 74 90.5 0.82 0.82 |
| | | | | | (4 lb/T SHMP 5 lb/T SMS) | (5 lb/T SHMP 2.5 lb/T S.A.) |
| 4 | Mine #1 | Recovery (% from crude) G.E. Brightness $TiO_2$ (%) $Fe_2O_3$ (%) | 79.9 2.98 0.92 | 87 84.8 2.93 0.88 | 72 90.6 0.51 0.90 | 61 90.0 0.59 0.90 |

SHMP: Sodium Hexametaphosphate
SMS: Sodium Metasilicate
S.A.: Soda Ash

Four 300 gram samples of the East Georgia clays utilized in Example I were dispersed in water to 65% clay solids with a quantity of dispersant and 0.3 grams of $NH_4Cl$ (2 lbs./ton of clay) and blunged using a Waring blender. Two different dispersant systems were used with each of the four clay samples. One was a blend of sodium hexametaphosphate (SHMP) and sodium metasilicate (SMS). The other was a blend of sodium hexametaphosphate (SHMP) and soda ash (SA). The amount of dispersant employed is shown in Table 1 and represents a level of dispersant sufficient to achieve minimum Brookfield viscosity at the 65% solids level utilized in these tests. Each of the samples were mixed (blunged) for a total of 15 minutes. Subsequent tests have indicated that a minimum of 3 minutes in a Waring blender is sufficient to disperse the clay slurry.

After this mixing step, each of the slips was diluted with water to 20% solids, and 0.05 grams (dry basis, 0.33 lbs/ton) of an anionic polymer, Nalco 8872 was added. The white clay product remaining in suspension was siphoned out after 10 minutes per inch depth of gravity settling (this slow settling rate results in better bottom consolidation and, hence, better clay recovery). The siphoned white clay was coagulated with aluminum sulfate (1.05 grams or 7 lbs/ton of crude clay) and sulfuric acid (0.9 grams of 6 lbs/ton of crude clay), leached with sodium hydrosulfite (0.9 grams or 6 lbs/ton of clay), filtered, redispersed, and spray dried. The results for each of the eight samples (4 clays×2 dispersants) are recorded in the "Selective Flocculation" columns of Table 1.

The selective flocculation process was effective in removing a substantial quantity of titanium and resulted in a product having a G.E brightness of approximately 90 or above. Moreover, no detrimental polyvalent cations were employed, the level of monovalent cations was low, no aging step was needed, and no extra coagulation reagents (i.e., acid and aluminum sulfate) were added. As a result, the process avoids the necessity of multiwashings to remove excess processing chemicals.

EXAMPLE III

One-Step Dispersant/Conditioning Agent Procedure

Four thousand grams of kaolin crude from an East Georgia mine was blunged in water at 60% solids with 5 pounds of sodium hexametaphosphate, 5 pounds of sodium metasilicate, and 3 pounds of ammonium chloride per ton of clay using a Cowles dissolver for 10 minutes. This blunged and reagent-conditioned clay was split into two portions: One was immediately diluted to 20% solids and 0.25 pounds (dry basis) of anionic polymer flocculant, Nalco 8872, per ton of clay was added for selective flocculation. The other was diluted to 40% solids and aged for 20 hours. The aged clay was further diluted to 20% solids and 0.25 pounds (dry basis) Nalco 8872 per ton of clay was added for selective flocculation. Both samples were gravity settled for 10 minutes per inch depth of slurry. The white clay suspension was siphoned out after settling, coagulated with 5 pounds of aluminum sulfate per ton of clay and sulfuric acid to pH 3.5, leached with 6 pounds of sodium hydrosulfite per ton of clay, filtered, redispersed, and spray dried. Product results are shown in Table II.

EXAMPLE IV

Two-Step Procedure: Dispersion Followed by Addition of Conditioning Agent

A sample of the crude clay employed in Example III was blunged in water at 60% clay solids for ten minutes with a dispersant consisting of 5 pounds of sodium hexametaphosphate and 5 pounds of sodium metasilicate per ton of clay using a Cowles dissolver. The blunged clay was diluted to 40% solids and 3 pounds of ammonium chloride was added per ton of clay. This reagent-conditioned clay was split into two portions: One portion was immediately diluted to 20% solids and 0.25 pounds of Nalco 8872 per ton of clay was added for selective flocculation. The other portion was aged for 20 hours and then diluted to 20% solids and 0.25 pounds (dry basis) Nalco 8872 per ton of clay was added to the sample. Both samples were further settled, siphoned, coagulated, leached, filtered, redispersed, and spray dried. Results are compared in Table II.

Examples III and IV indicate that the ammonium chloride conditioning agent can be added either at the blunging stage or after clay dispersion. All samples prepared in Examples III and IV had pH values of around 6.5 at 20% solids before addition of polymer flocculant. No pH adjustment was required, nor was it necessary to age the slip prior to the addition of the polymer flocculant.

TABLE II

| Example Number | Addition Mode of Conditioning Reagent | 20 Hrs. Aging Before Adding Polymer Flocculant | Product Properties | | |
|---|---|---|---|---|---|
| | | | G.E. Bri. | $TiO_2$ Content % | $Fe_2O_3$ Content % |
| III | at Blunging | No | 91.0 | 0.71 | 0.93 |
| | at Blunging | Yes | 90.4 | 0.87 | 0.90 |
| IV | After Blunging | No | 90.1 | 0.84 | 0.89 |
| | After Blunging | Yes | 89.4 | 1.02 | 0.90 |

EXAMPLE V

Effects of Polymer Flocculants

A sample of the crude clay utilized in Example II, Sample 3, was blunged in water at 60% solids for 10 minutes with 4 pounds of sodium hexametaphosphate, 4 pounds of sodium metasilicate, and 2 pounds of ammonium chloride per ton of clay using a Cowles dissolver for 10 minutes. This blunged clay was then diluted to 20% solids and an anionic polymer, Percol 730, was added to the sample for flocculation and settling. The amount of Percol 730 used was based on 0.25 lbs per ton of clay. The white clay remaining in suspension was removed and coagulated, leached, filtered, redispersed, and spray dried. The product had the following properties:

Recovery: 77%
G.E. Brightness: 90.7
$TiO_2$ Content: 0.73%
$Fe_2O_3$ Content: 0.80%

EXAMPLE VI

Effect of Polymer Flocculant

A sample of the crude clay employed in Example V was blunged in water at 60% solids with 4 pounds of sodium hexametaphosphate, 4 pounds of sodium metasilicate and 3 pounds of ammonium chloride per ton of clay using a Cowles dissolver for 10 minutes. This blunged clay was then diluted to 20% solids, divided into three portions, and three different levels of an anionic polymer, Percol 90L, were added for flocculation and settling. The white clay remaining in suspension was removed and coagulated, leached, filtered, redispersed, and spray dried. Results are shown in Table III.

TABLE III

| Polymer Flocculant Percol 90 L Dosage (Pound Dry Basis Per Ton of Clay) | Product Qualities | | | |
|---|---|---|---|---|
| | Recovery % | G.E. Bri. | $TiO_2$ Content % | $Fe_2O_3$ Content % |
| 0.25 | 85 | 89.2 | 1.22 | 0.77 |
| 0.38 | 83 | 89.7 | 1.10 | 0.80 |
| 0.50 | 79 | 90.5 | 0.83 | 0.80 |

Percol 730 and Percol 90L are weak anionic polymers with high molecular weight. Examples V and VI suggest that any weak anionic polymer is effective in this selective flocculation process.

EXAMPLE VII

Effect of Ammonium Sulfate

A sample of the same crude clay utilized in Example V was blunged in water at 60% solids with 4 pounds of sodium hexametaphosphate, 4 pounds of sodium metasilicate, and 3.5 pounds of ammonium sulfate per ton of clay using a Waring blender for 10 minutes. This blunged clay was then diluted to 20% solids, and 0.25 pounds (dry basis) of Nalco polymer 8872 per ton of clay was added for flocculation. The white clay product was siphoned out after 10 minutes per inch slurry depth of gravity settling, coagulated with sulfuric acid and 7 pounds of aluminum sulfate per ton of clay, and sulfuric acid to pH 3.5 leached with 6 pounds of sodium hydrosulfite per ton of clay, filtered, redispersed, and spray dried. The resulting product had the following characteristics:

Recovery: 78%
G.E. Brightness: 89.7
$TiO_2$ Content: 0.81%
$Fe_2O_3$ Content: 0.81%

U.S. Pat. No. 3,857,781 mentions that ammonium sulfate is not effective in the method of that invention, suggesting a different mechanism of this process from that of U.S. Pat. No. 3,857,781.

EXAMPLE VIII

Effects of $CaCl_2$ Conditioning Reagents

Another sample of the crude clay utilized in Example II, Sample 2, was blunged in water at 60% solids with 3.5 pounds of sodium hexametaphosphate, 4 pounds of sodium metasilicate and 2 pounds of calcium chloride per ton of clay using a Waring blender for 10 minutes. This blunged clay was then diluted to 20% solids and 0.33 pounds (dry basis) of Nalco 8872 polymer per ton of clay was added for flocculation. The white clay product was siphoned out after 10 minutes per inch slurry depth of gravity settling and coagulated, leached (6 pounds of sodium hydrosulfite per ton of clay), filtered, redispersed, and spray dried. Results were as follows:

Recovery: 53%
G.E. Brightness: 86.8
$TiO_2$ Content: 1.78%
$Fe_2O_3$ Content: 0.89%

This represents an increase of 3.9 in G.E. Brightness (86.8 minus 82.9) compared to the classified control run on the same clay. (See Table 1.) By way of contrast, the use of ammonium chloride resulted in a G.E. Brightness of 91.1 (Table 1), an increase of 8.2 brightness units, illustrating the superiority of the ammonium chloride conditioning reagent.

EXAMPLE IX

Effect of NaCl Conditioning Reagent

The same crude and the same processing procedures as Example VIII were employed except that 3 pounds of sodium chloride per ton of clay was used in blunging, in lieu of calcium chloride. Results were as follows:

Recovery: 60%
G.E. Brightness: 86.5
$TiO_2$ Content: 1.36%
$Fe_2O_3$ Content: 0.88%

This represents as increase of 3.6 G.E. Brightness units when compared with the classified control. As shown in Table 1, the use of ammonium chloride resulted in an increase of 8.2 brightness units. Examples VIII and IX indicate that cations other than $NH_4^+$, when used as conditioning reagents, are not as effective in removing titanium impurities.

EXAMPLE X

Effects of Dosage of Conditioning Reagent and Flocculant

Five samples of an East Georgia crude clay were blunged in water at 60% solids in the presence of SHMP and SMS, each added at a level of 5 lbs/ton. The clay samples were mixed in a Cowles dissolver for ten minutes at five different levels of ammonium chloride (i.e., 0.5, 1, 2, 3 and 4 lbs/ton of clay). These blunged samples were diluted to 20% solids and each sample further divided into three aliquots. An anionic polymer, Nalco 8872, was added to the samples at three different levels—0.17 lb., 0.25 lb, and 0.33 lb (dry basis) per ton of clay—for flocculation. The white clay product was siphoned out after 10 minutes per inch slurry depth of gravity settling and spray dried for titanium impurities determination. Results are shown in Table IV.

TABLE IV

| Levels of Conditioning Reagent, NH$_4$Cl (lb/T) | Product Recovery - % | | | TiO$_2$ Content in Product | | |
|---|---|---|---|---|---|---|
| | 0.17 lb/T Nalco 8872 | 0.25 lb/T Nalco 8872 | 0.33 lb/T Nalco 8872 | 0.17 lb/T Nalco 8872 | 0.25 lb/T Nalco 8872 | 0.33 lb/T Nalco 8872 |
| 0.5 | 90 | 88 | 85 | 1.63 | 1.50 | 1.45 |
| 1 | 86 | 84 | 82 | 1.43 | 1.40 | 1.02 |
| 2 | 83 | 78 | 74 | 0.85 | 0.61 | 0.49 |
| 3 | 74 | 68 | 67 | 0.35 | 0.31 | 0.24 |
| 4 | 58 | 48 | 42 | 0.39 | 0.27 | 0.20 |

This example indicates the possibility of controlling impurity removal by regulating the conditioning reagent dosages and the flocculant dosages. This regulating method can produce different degrees of brightness products depending on the product requirements and specifications.

EXAMPLE XI

Effect of Solids Level During Flocculation

Figure 1:
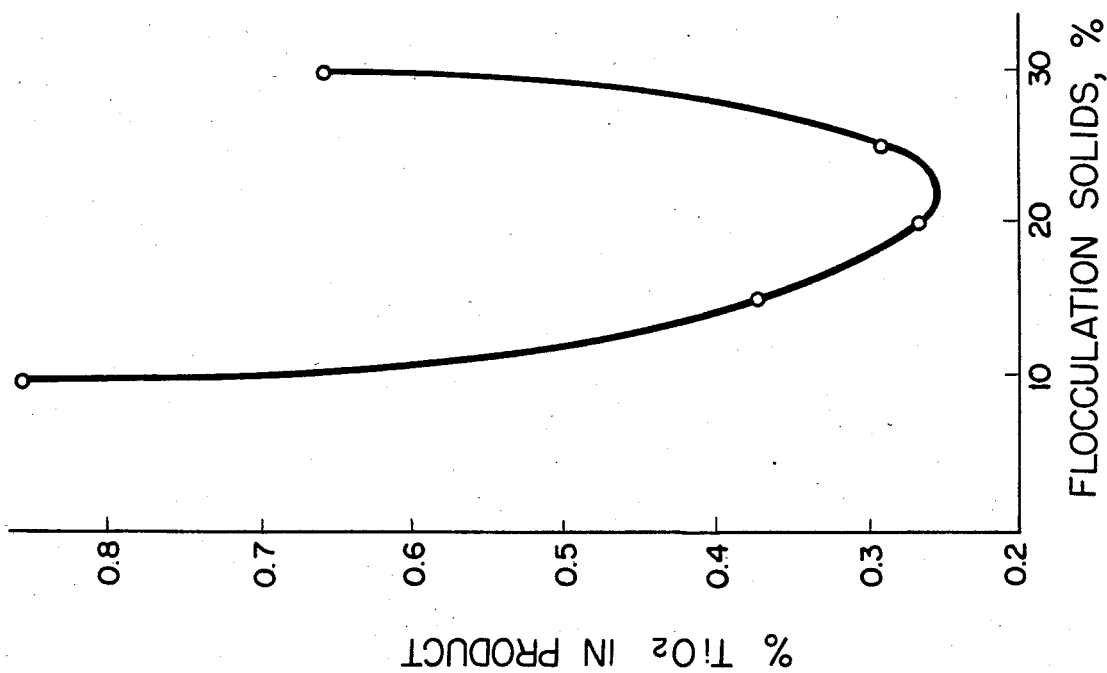

Three thousand grams of an East Georgia crude was blunged in water at 60% solids with 5 pounds of sodium hexametaphosphate, 5 pounds of sodium metasilicate, and 3 pounds of ammonium chloride per ton of clay using a Cowles Dissolver for 10 minutes. This conditioned clay was then degritted using 100 mesh screen and diluted to several different solids levels. Anionic polymer Nalco 8872 at 0.25 pounds (dry basis) per ton of clay was then added to these conditioned and diluted samples having different solids levels. All products were siphoned out after 10 minutes per inch slurry depth of gravity settling. Results are shown in FIGS. 1 and 2.

These results indicate that the lowest impurity product results from flocculating and settling at around 20% solids. These results are unexpected. In general, the lower the flocculating and settling solids, the better the separation (e.g., the 5% flocculating solids requirement of U.S. Pat. No. 3,701,417).

EXAMPLE XII

Effects of Multi-Washes

Six thousand grams of an East Georgia crude was blunged in water at 60% solids with 5 pounds of sodium hexametaphosphate, 5 pounds of sodium metasilicate, and 3 pounds of ammonium chloride per ton of clay using a Cowles dissolver for 10 minutes. This blunged clay was then diluted to 20% solids and 0.25 pounds (dry basis) Nalco 8872 was added. The white clay remaining in suspension was siphoned out after 10 minutes per inch slurry depth of gravity settling, and split into three portions:

1. Leach after Filtration:

One portion was coagulated with sulfuric acid and 5 pounds of aluminum sulfate per ton of clay, and filtered. The filtered cake was reslurried to 20% solids, recoagulated with sulfuric acid, leached with 6 pounds of sodium hydrosulfite per ton of clay, refiltered, redispersed, and spray dried to obtain a final product.

2. Single Filtration:

A second portion was coagulated with sulfuric acid and 5 pounds of aluminum sulfate per ton of clay and leached with 6 pounds of sodium hydrosulfite per ton of clay. This coagulated and leached clay was filtered once, redispersed, and spray dried to obtain a final product. (Conventional clay processing employs a similar procedure).

3. Double Filtration:

The third portion was subjected to the same process as the second portion. However, the filtered cake was reslurried to 20% solids and then refiltered, redispersed, and spray dried for final product. Product results are compared in Table V.

TABLE V

| | Product Qualities | | |
|---|---|---|---|
| Washing Methods | G.E. Bri. | Brookfield Viscosity cps using 20 rpm #1 Spindle | Hercules Viscosity Dynes at 1100 rpm |
| (1) Leach After Filtration | 89.0 | 267 | 1.1 |
| (2) Single Filtration | 89.0 | 275 | 1.1 |
| (3) Double Filtration | 89.1 | 249 | 1.1 |

Crude Clay:
78.2: G.E. Brightness 3.01%: TiO$_2$ Content
0.88%: Fe$_2$O$_3$ Content
Selective Flocculation Product:
89.0: G.E. Brightness
0.80%: TiO$_2$ Content
0.86%: Fe$_2$O$_3$ Content Example XII illustrates the insignificant improvement of product quality resulting from multi-washing. Because the process uses a very small amount of ammonium salt conditioning agent, the contamination of the clay product is minimal, and thus does not require repeated washings to remove residual salts.

EXAMPLE XIII

Prior Art Flocculation Process

Four thousand grams of an East Georgia crude was blunged in water at 68% solids with 5 pounds of sodium hexametaphosphate and 15 pounds of sodium metasilicate per ton of clay using a Cowles dissolver for 20 minutes. This blunged clay was then diluted to 40% solids and 15 pounds of sodium chloride per ton of clay was mixed in. The conditioned clay was then split into two portions: one portion was aged for 20 hours before adding polymer flocculant; and in the other, polymer flocculant was added immediately. A strong anionic and very high molecular weight polymer, Nalco 1DD739, was added at 0.25 pounds (dry basis) per ton of clay to the diluted, conditioned clay (25% solids). This flocculated clay was then settled by gravity and the white clay suspension recovered. The white clay products obtained from both the aged and the unaged samples were further coagulated with 9 pounds of sulfuric acid and 14 pounds of aluminum sulfate per ton of clay and filtered. Both filtered clay samples were reslurried to 25% solids, leached with 6 pounds of sodium hydrosulfite, and additional sulfuric acid was added to reach pH 3.5, then refiltered, redispersed, and spray dried for final product.

As shown in the results of Table VI, the aged product served to reduce the titanium impurities from 2.58% down to 0.86%. However, the sample without aging reduced the titanium impurities down to only 2.12%.

TABLE VI

| Sample Identification | Product Qualities | | | |
|---|---|---|---|---|
|  | Recovery % | G.E. Bri.* | TiO$_2$ Content % | Fe$_2$O$_3$ Content % |
| U.S. Pat. No. 3,857,781 with 20 hrs. aging | 53 | 89.1 | 0.86 | 0.87 |
| U.S. Pat. No. 3,857,781 without aging | 58 | 85.6 | 2.12 | 0.88 |

*with 6 lb/T sodium hydrosulfite leaching

Feed Crude:
G.E. Brightness (no leach): 79.2
TiO$_2$ Content: 2.58%
Fe$_2$O$_3$ Content: 0.93

What is claimed:

1. A method of removing titanium impurities from kaolin clay comprising the following steps in sequence:
   (A) blunging an aqueous kaolin clay suspension having 45 to 70 percent solids by weight, said suspension containing (i) an amount of dispersing agent sufficient to achieve minimum viscosity for said suspension and substantially free of excess dispersing agents, and (ii) 0.1 pounds to 10.0 pounds, per ton of dry clay, of a conditioning agent consisting essentially of a water-soluble ammonium salt;
   (B) diluting the blunged clay suspension with an amount of water sufficient to form a clay slip having 10 to 40 percent solids by weight;
   (C) adding 0.01 pounds to 5.0 pounds, per ton of dry clay, of a water-dispersible anionic polymer to said clay slip, whereby a separation of titanium-containing flocs is effected from said slip and
   (D) separating a white claim product from said titanium-containing flocs;
   wherein steps A, B and C are performed in a substantially continuous manner, without aging said blunged clay suspension or said clay slip.

2. The method of claim 1 wherein said ammonium salt conditioning agent is present in an amount between 0.5 pounds and 5.0 pounds per ton of dry clay.

3. The method of claim 1 wherein the pH of said aqueous clay suspension during said blunging step is in the range 5 to 11.

4. The method of claim 3 wherein said pH is approximately neutral.

5. The method of claim 1 wherein the solids level of said aqueous clay suspension during said blunging step is approximately 65 percent solids by weight.

6. The method of claim 1 wherein said dispersing agent is selected from the group consisting of
   (a) a mixture of sodium hexametaphosphate and sodium metasilicate; and
   (b) a mixture of sodium hexametaphosphate and soda ash.

7. The method of claim 1 wherein said conditioning agent is ammonium chloride.

8. The method of claim 1 wherein the solids level of said blunged clay suspension during said slip-forming step is approximately 20 percent solids by weight.

9. The method of claim 1, further including an iron-removal procedure, comprising the following steps in sequence:
   coagulating said white clay product with a mixture of sulfuric acid and/or aluminum sulfate;
   leaching the coagulated clay product with an iron-reducing material selected from the group consisting of zinc and sodium hydrosulfite; and
   filtering said coagulated clay product.

10. A method of removing titanium impurities from kaolin clay comprising the following steps in sequence:
   (A) blunging an aqueous kaolin clay suspension having 45 to 70 percent solids by weight, said suspension containing an amount of dispersing agent sufficient to achieve minimum viscosity for said suspension and substantially free of excess dispersing agents;
   (B) adding 0.1 pounds to 10.0 pounds, per ton of dry clay, of a conditioning agent to said blunged clay suspension, said conditioning agent consisting essentially of a water-soluble ammonium salt;
   (C) diluting said clay suspension with an amount of water sufficient to form a clay slip having 10 to 40 percent solids by weight;
   (D) adding 0.01 pounds to 5.0 pounds, per ton of dry clay, of a water-dispersible anionic polymer to said clay slip, whereby a separation of titanium-containing flocs is effected from said slip, and
   (E) separating a white clay product from said titanium-containing flocs;

wherein steps A, B, C and D are performed in a substantially continuous manner, without aging said blunged clay suspension or said clay slip.

11. The method of claim 10 wherein said ammonium salt conditioning agent is present in an amount between 0.5 pounds and 5.0 pounds per ton of dry clay.

12. The method of claim 10 wherein the pH of said aqueous clay suspension during said blunging step is in the range 5 to 11.

13. The method of claim 12 wherein said pH is approximately neutral.

14. The method of claim 10 wherein the solids level of said aqueous clay suspension during said blunging step is approximately 65 percent solids by weight.

15. The method of claim 10 wherein said dispersing agent is selected from the group consisting of (a) a mixture of sodium hexametaphosphate and sodium metasilicate; and
(b) a mixture of sodium hexametaphosphate and soda ash.

16. The method of claim 10 wherein said conditioning agent is ammonium chloride.

17. The method of claim 10 wherein the solids level of said blunged clay suspension during said slip-forming step is approximately 20 percent solids by weight.

18. The method of claim 10 further including an iron-removal procedure, comprising the following steps in sequence:
coagulating said white clay product with a mixture of sulfuric acid and/or aluminum sulfate;
leaching the coagulated clay product with an iron-reducing material selected from the group consisting of zinc and sodium hydrosulfite; and
filtering said coagulated clay product.

* * * * *